(No Model.)
E. T. BURGESS.
SOLDERING STOVE.
No. 515,993. Patented Mar. 6, 1894.
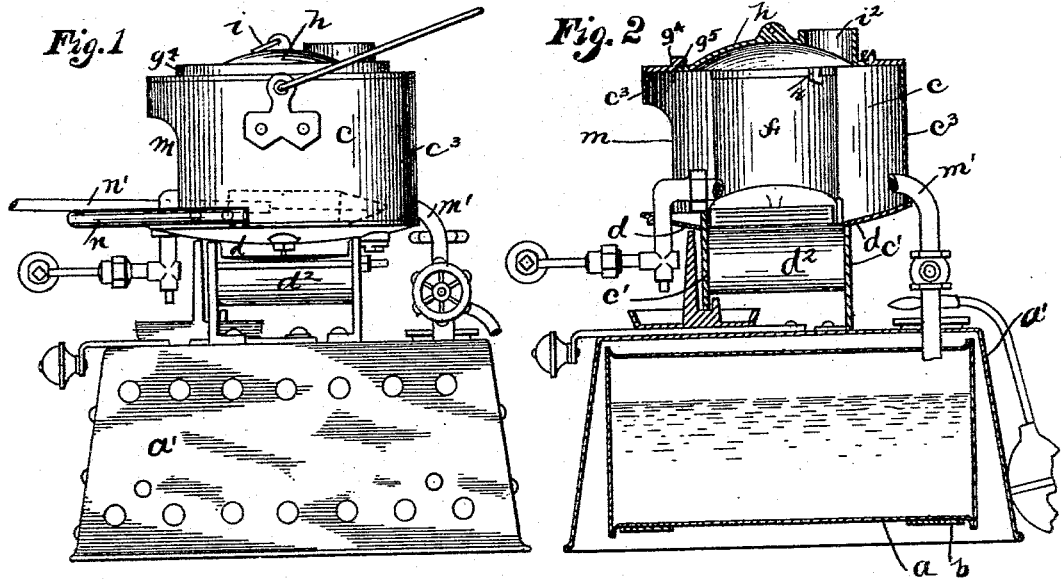
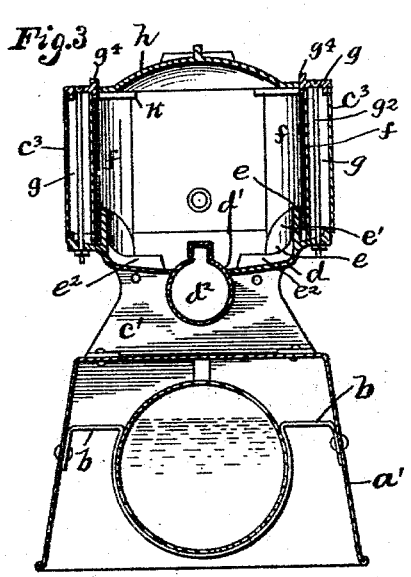
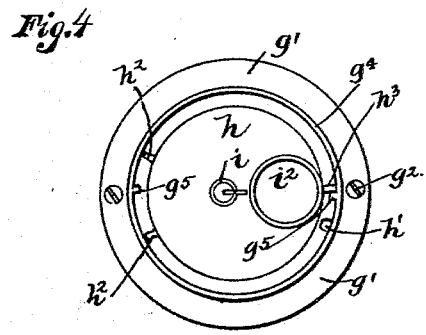
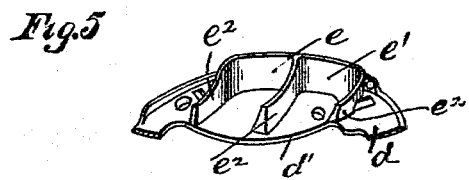
WITNESSES:
J. H. Fravel
H. B. Bradshaw
INVENTOR
Edward T. Burgess
BY
Staley and Shepherd
ATTORNEYS.

UNITED STATES PATENT OFFICE.

EDWARD T. BURGESS, OF COLUMBUS, OHIO.

SOLDERING-STOVE.

SPECIFICATION forming part of Letters Patent No. 515,993, dated March 6, 1894.

Application filed June 4, 1892. Serial No. 435,506. (No model.)

*To all whom it may concern:*

Be it known that I, EDWARD T. BURGESS, a citizen of the United States, residing at Columbus, in the county of Franklin and State of Ohio, have invented a certain new and useful Improvement in Soldering-Stoves, of which the following is a specification.

My invention relates to the improvement of soldering stoves and the objects of my invention are to provide a stove of this class of superior construction and arrangement of parts, which will greatly facilitate the operation of heating soldering irons therein; to provide superior means for supporting a soldering pot thereon; to provide a cover for said stove top and a superior means for retaining said cover thereon; to provide improved means for supporting the body of the soldering iron and imparting heat thereto uniformly; to provide the oil reservoir with a casing and to produce other improvements which will be more specifically pointed out hereinafter. These objects I accomplish in the manner illustrated in the accompanying drawings, in which—

Figure 1 is a side elevation of my improved soldering stove. Fig. 2 is a central vertical section of the same. Fig. 3 is a central vertical section taken at right angles with that shown in Fig. 2. Fig. 4 is a plan view of the stove body and Fig. 5 is a detail view in perspective of a portion of the bottom plate of the heat chamber.

Similar letters refer to similar parts throughout the several views.

$a$ represents an oil reservoir preferably of a cylindrical form and $a'$ a casing therefor of a substantially inverted pan-shaped form, said oil reservoir being supported or suspended within said casing by means of suitable supporting bracket arms $b$ which project from the inner side of said casing.

$c$ represents the stove body or flame-chamber, which is preferably of the cylindrical form shown, said body being supported upon suitable brackets or standards $c'$ which rise from the upper side of the casing $a'$.

$d$ represents the circular flue or bottom plate of a stove or heating chamber, said bottom plate being provided as indicated in the drawings, with a central longitudinal slot indicated at $d'$, through which projects from the under side thereof, the upper portion or head of a burner $d^2$. In forming this bottom plate $d$, the same is depressed or concaved to cause its projection below the side walls or casing $c^3$ of the stove body, as shown in the drawings.

$e$ represents soldering iron rests which are formed integral with the bottom plate $d$ on opposite sides of the burner $d^2$. As shown in Fig. 5 of the drawings, each of these iron rests consists of a curved outer or back portion $e'$ which rises from the bottom $d$ and from each end to the center of which extend inwardly to points near the slotted opening $d'$, arms $e^2$, said arms being as hereinafter described, adapted to support the body of the soldering iron.

$f$ represents curved flue plates, one of which rises from the bottom plate $d$, on the outer side of each of the back pieces $e'$ of the iron rests. These oppositely located flue plates are supported as shown, a short distance from the inner side of the casing $c^3$ with which they are parallel. The flues or side passages $g$ thus formed between said stove casing and flue plates $f$ are covered by a ring plate $g'$, which connects the tops of said casing and flue plates and which is connected at desired intervals with the bottom plate $d$, by transverse bolts $g^2$ which pass through said flues, as shown. With the inner edge of the ring plate $g$, I provide an upwardly projecting flange $g^4$, on the outer side of which are formed at points diametrically opposite each other, inwardly projecting lugs $g^5$. From the under side of this ring plate $g'$, projecting inwardly at desired intervals are horizontal lugs $k$.

$h$ represents my improved stove top or cover which is preferably of the disk and dome shape, shown. The outer flattened rim or base of this plate $h$ has formed therein as shown at $h'$, a suitable notched opening, while said rim has formed on the outer side thereof, at points on the opposite side of said top plate from that on which is located the notch $h'$, upwardly projecting lugs $h^2$, arranged a short distance from each other, as shown. A similar lug $h^3$ is formed on said top rim or base, a short distance from the notch $h'$. This top-plate $h$ may be provided with a suitable handle $i$ and has formed therein a suitable opening $i^2$. In temporarily securing the top plate $h$ in its position on the stove, I insert that portion of the top plate edge which is between the lugs $h^2$ beneath one of the lugs $g^5$ of the flange $g^4$, and cause the remaining lug $g^5$ to pass through the top-plate notch $h'$ said top plate being thus seated upon the lugs $k$. By giving the top-plate a partial rotation, it will be seen that the notch $h'$ will be brought out of alignment with the lugs $g^5$ and that the side lugs $g^5$ will thus prevent the direct removal of said top plate. The forward side of the stove body $c$ is provided with a door-way $m$. Through this door-way passes the horizontal arm of the usual oil-pipe $m'$, which passing outwardly through the rear side of the stove-body extends downward and into the reservoir $a$.

$n$ represents a rest or bracket arm which is supported from the stove-body at the base of the opening $m$, said rest being adapted to receive the handle-portion $n'$ of a soldering iron when the body of the latter is resting upon one of the sockets $e$ within the stove.

The gas being generated and lighted at the burner in the usual manner, it will be seen that the flame from said burner, owing to the fact that the burner openings are on the longer sides of the latter, will be directed against and over the bodies of the soldering irons and that the depressed or concave form of the bottom plate $d$ will afford access of the flame to the under side of said irons and the portions of said flame which are thus directed beneath the irons, will by contact with the rear plate $e'$ of the rest $e$, be directed against the rear or outer sides of said irons. In this manner the entire side surface of each of the irons is subjected to the action of the flame. In order to insure the heating of the inner ends of the wires, I provide the flues $g$, said flues serving to conduct currents of air which are heated therein from the opening $m$ of the stove to the rear or inner portion thereof, thus imparting to the inner ends of the irons hot air currents for heating the same. It is evident that the use of the flue plates $f$ will also result in protecting the bolts $g^2$ from the direct action of the flame and that the heavier back-plates $e'$ of the the rests $e$ will in turn serve to screen the lower portions of said flue plates.

The means herein described for incasing the oil reservoir and suspending the latter within said casing will serve to prevent said reservoir from becoming dented, punctured or otherwise injured while said case will further serve as a supporting base for the stove.

It is evident that I may readily remove the stove top-plate $h$ and support upon the lugs $k$ any desirable form of soldering pot or plate.

From the construction herein shown and described, it will readily be seen, that the soldering irons may be so supported within my improved stove as to subject the bodies thereof to a uniform heat, and that the parts of my improved stove are so formed and arranged as to insure durability and strength and admit of the same being produced at a reasonable cost of manufacture.

Having now fully described my invention, what I claim, and desire to secure by Letters Patent, is—

1. In a soldering stove, the combination of the stove body or flame chamber, a burner head projecting through the bottom plate thereof, and iron rests $e$ rising from said bottom plate on opposite sides of said burner, said rests consisting of a back-plate or deflector $e'$ and arms $e^2$, substantially as and for the purpose specified.

2. In a soldering stove, the combination of the stove body or flame chamber having a concaved or depressed bottom portion as described, a burner head projecting within said chamber, through said depressed bottom portion and iron rests $e$ formed integral with said bottom portion, and projecting therefrom, on opposite sides of said burner head, said rests consisting of arms or ribs $e^2$, substantially as and for the purpose specified.

3. In a soldering stove, the combination of the cylindrical stove or flame chamber, a burner head projecting within said chamber through the bottom plate thereof, soldering iron supporting ribs or rests $e^2$ rising from said bottom plate on opposite sides of said burner head, and said flues $g$ connecting as described, the forward and rear portions of said flue chamber, substantially as and for the purpose specified.

4. In a soldering stove, the combination of the cylindrical stove or flame chamber having a suitable burner therein, a ring plate $g'$ about the upper side of said stove body, a flange $g^4$ thereon, lower lugs $k$ and upper lugs $g^5$ projecting inwardly therefrom, a top plate $h$ having a notch $h'$ adapted to receive one of said lugs $g^5$, substantially as and for the purpose specified.

EDWARD T. BURGESS.

In presence of—
C. C. SHEPHERD,
THOS. S. GATES.